Figure 11:
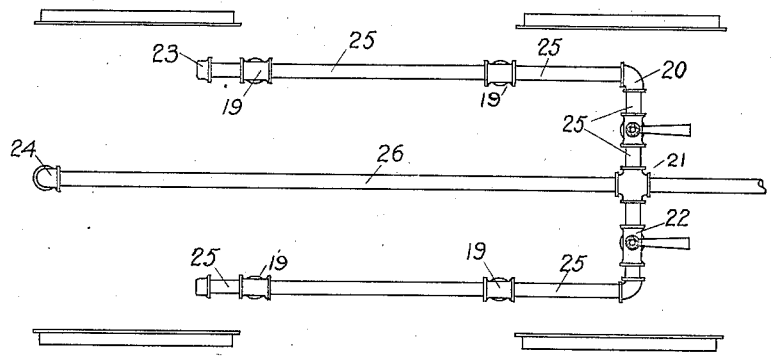

H. C. STANLEY.
BRAKE BEAM COUPLING.
APPLICATION FILED MAR. 5, 1915.
1,183,501.
Patented May 16, 1916.
3 SHEETS—SHEET 1.
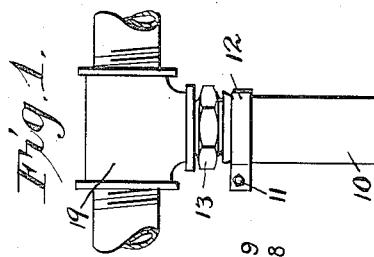
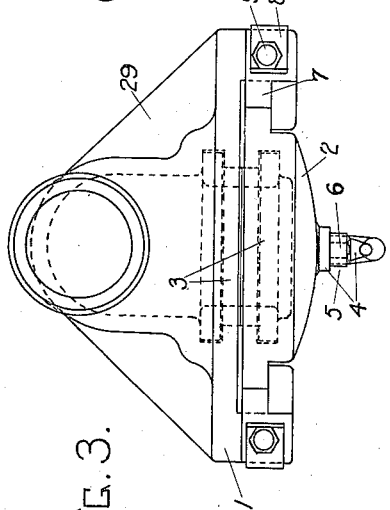
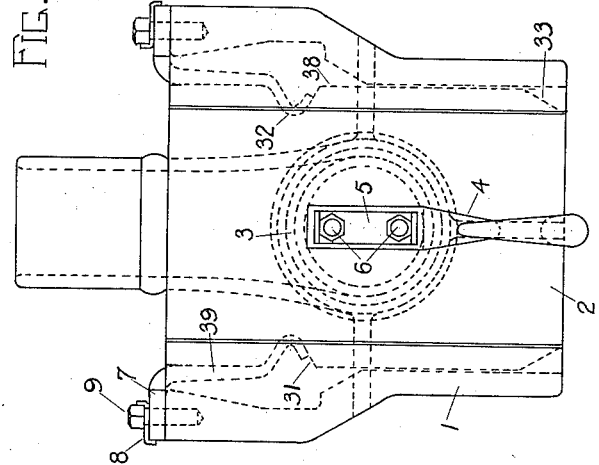
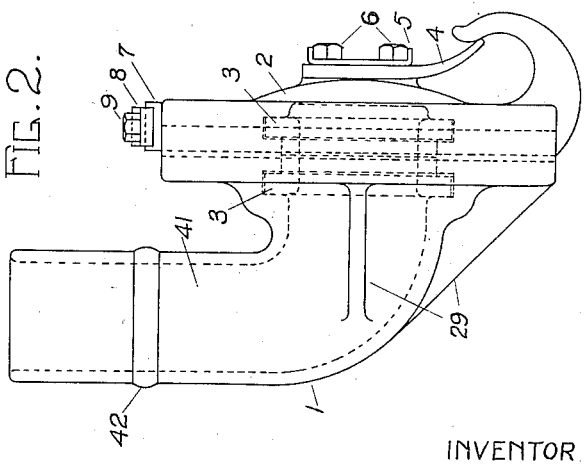
WITNESSES
INVENTOR
Harold Chester Stanley

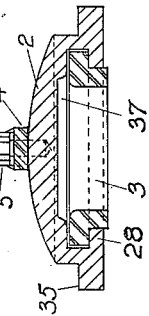
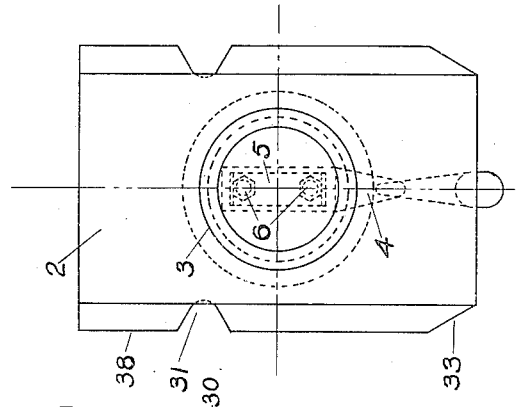
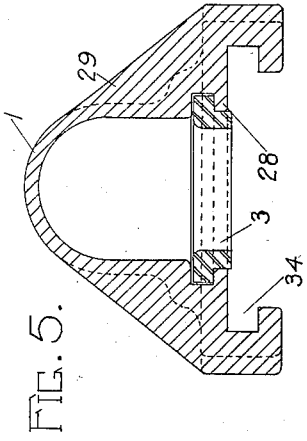
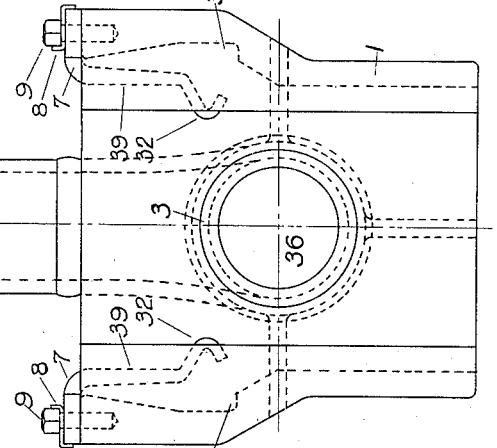
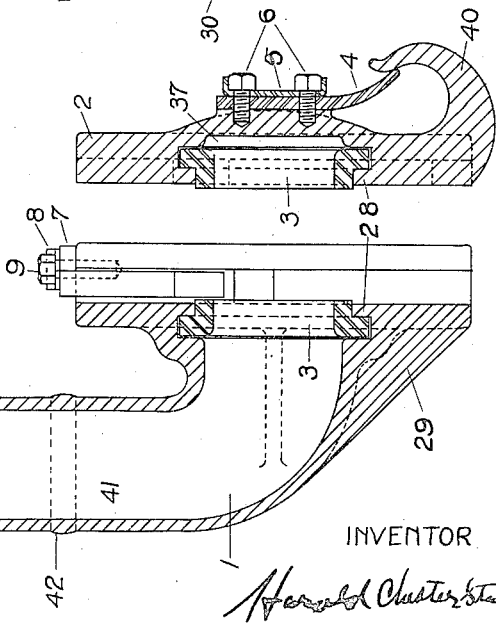

H. C. STANLEY.
BRAKE BEAM COUPLING.
APPLICATION FILED MAR. 5, 1915.

1,183,501.

Patented May 16, 1916.
3 SHEETS—SHEET 3.

WITNESSES

INVENTOR
Harold Chester Stanley

UNITED STATES PATENT OFFICE.

HAROLD CHESTER STANLEY, OF LOUISVILLE, KENTUCKY.

BRAKE-BEAM COUPLING.

1,183,501. Specification of Letters Patent. Patented May 16, 1916.

Application filed March 5, 1915. Serial No. 12,386.

*To all whom it may concern:*

Be it known that I, HAROLD CHESTER STANLEY, a citizen of the United States, residing at Louisville, county of Jefferson, State of Kentucky, have invented a new and useful Brake-Beam Coupling, of which the following is a full, clear, and exact specification and description.

My invention contemplates the connection of the air line, commonly known as the train line, on engines, freight and passenger cars, electric cars, and all vehicles where air is used as a braking power, with the brake beams on such vehicles by means of pipes, flexible hose, coupling, and chain, which coupling, when a brake beam or either end of same drops or is forced from its normal position, will be pulled open by the drop of the brake beam and will thereby release the air from said air line or train line causing the brakes to be set and the train or other vehicle to gradually slow down and stop.

My invention is dependent upon and to be used on vehicles where the modern air brake system is in use. Brake beams are subject to many jars and jerks and, very often, when the train or car or vehicle is in motion, the brake beam tears loose from its connection with the bottom of the car or vehicle, or is forced out of place by the greatly increased pressure due to the application of the air brake, and falls down in the way of the wheels, often resulting in the derailment of the car and the ditching of the train and a disastrous wreck.

The object of my invention is to prevent or minimize just such accidents by the above mentioned connection of the train line with the brake beam by an emergency coupling which coupling is so constructed that it is pulled open by a falling brake beam and the release of the air through said open coupling sets the brakes. The face of this coupling has vertical guides or slots in the form of jaws which embrace and hold in position a wedge which, when pulled down and out of said coupling face, exposes the opening in said coupling face thus releasing the air from said coupling and train line, all leakage of air when the coupling and the wedge are in their normal positions being prevented by suitable rubber gaskets, one in the face of the coupling at the opening and one in the wedge placed face to face and said wedge being connected at its lower tip with the brake beam by means of a chain.

My invention is illustrated in the accompanying drawings which display the best means of attaining the object of my invention and which, with the numerals of reference marked thereon, form a part of this specification and in which:—

Figure 10:
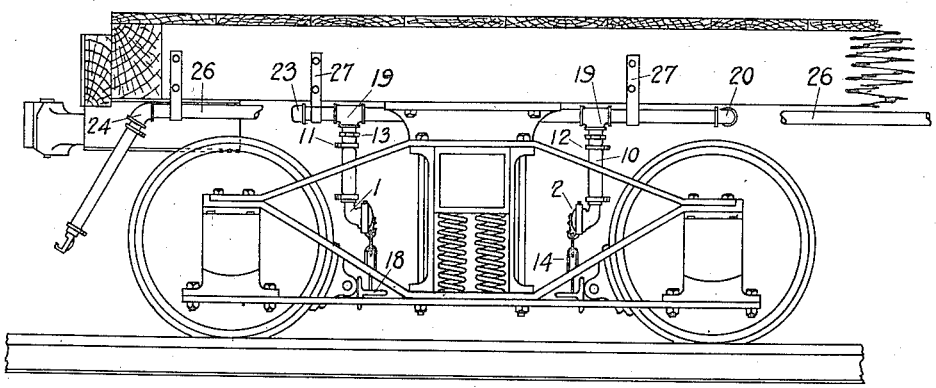

Figure 1 is an assembled view of the coupling. Fig. 2 is an elevation of the coupling head complete. Fig. 3 is a plan of the coupling head complete. Fig. 4 is a front elevation of the coupling head complete. Fig. 5 is a cross section of the coupling head with the wedge removed. Fig. 6 is a cross section of the wedge. Fig. 7 is a longitudinal section of the coupling head and the wedge. Fig. 8 is an elevation of the face of the coupling head. Fig. 9 is an elevation of the face of the wedge. Fig. 10 is an elevation of a truck on a car equipment with inside brake beams showing the coupling connected at the upper end with a pipe leading to the train pipe and connected at the lower end with the brake beam by means of a chain. Fig. 11 is a plan showing the best practical means of making the pipe connection with the train pipe.

Before making a detailed explanation of the coupling let us refer to Fig. 11 in which is shown the best way to arrange the pipes connecting with the train line in reference to one truck on a car equipped with inside brake beams. The train line is designated by numeral 26. At 21 the pipe connection is made with the train line by means of a four way connection or cross, the pipes being attached to the sills or bottom of the car or vehicle by means of strap hangers 27 (Fig. 10) or in any other convenient way, and conducted at right angles to the train line and along the bottom of the vehicle until reaching turn 20 (Fig. 11) where a screw elbow is used and the pipes should continue as shown to such a point as will allow all necessary connections of said pipe with the several brake beams. These side pipes are designated by numeral 25. The ends of these pipes on each side of the truck are closed by screw caps 23. Fig. 11 shows four coupling connections made in each instance by means of a T at 19, each one of which four points should be as nearly as possible directly over a brake shoe. There must always be two couplings on each and every brake beam, one at each end of same. My drawing only attempts to show a sample truck. There should be cut-off cocks at 22 one on each side pipe line so that when desirable the air may be turned off from the whole or half of the truck. My brake beam coupling is intended in no way to support a brake beam, said brake beam always having an independent support.

Fig. 10 shows two couplings connected with the brake beams. A piece of flexible rubber hose 10, of suitable length, fitted at the upper end with a threaded nipple 13 is screwed into T 19, said nipple being attached to the hose by a hose band 12; the lower end of the hose is attached to the coupling head 1 and firmly held in place by a hose band. In the face of the coupling head and closing the opening therein fits a solid wedge 2 which has a hook at the lower tip to which is attached a chain 14 which is connected with the brake beam 18. Air flows through the train line 26 to the side pipes 25 and into the hose 10 and into the coupling head 1. When the brake beam 18 falls it pulls down the chain which pulls out the wedge 2 and exposes the opening in the face of the coupling head thereby releasing the air from the train line. The result of course is that the brakes are set on the train or other vehicle and said train or vehicle gradually slows down and stops. The length of the hose 10 and chain 14 shall in every instance depend upon the distance between the T 19 and the brake beam, it being desirable to make the hose long enough to have some flexibility and it being necessary that the chain shall have sufficient slack.

The arrangement of pipes connecting with the train line as shown in Fig. 11 is the best arrangement under the circumstances. Under this arrangement the pipes are kept away from and do not interfere in any way with the draft timbers which occupy a position near the end of the car running a part way over the trucks. It will be a question for the exercise of judgment by one who makes use of my coupling device just how and where the said pipes should be bent and where strap hangers should be placed. The most convenient and practical method in each instance should be made use of, the one necessity being the connection of the air in the train line with my coupling by means of side pipes and the connection of said coupling with the brake beam of the car. The chain 14 shall in every instance be sufficiently slack so that the wedge shall not be pulled from the coupling head by the ordinary vibration and the ordinary movements of a brake beam. This chain shall also be strong enough to pull out the wedge when a brake beam falls and not first be broken itself. In Fig. 1 we have an example of a T brake beam 18 and in this instance the chain 14 is attached to the brake beam by means of a bolt 17 with a cotter pin and a shackle 16.

Let us now look at Fig. 2 which is an elevation of the coupling head 1 with the wedge 2 in place. The rubber gaskets 3 are shown face to face, the gasket in the face of the coupling head being held in place by a rim in which the gasket fits and the gasket in the face of the wedge being held in place by a rim in the face of the wedge in which said gasket fits. The air passage through the coupling head is designated by numeral 41. Numeral 42 designates a rim on the outside of the pipe end of the coupling head which will tend to make the connection of the coupling head and the flexible hose more secure. The coupling head shall be straightened by raised ribs 29 at three points on the outside of the coupling head equidistant from each other.

In Fig. 8 I have shown an elevation of the face of the coupling head showing the opening 36 in the coupling head for the emission of air, with a rubber gasket 3 which fits into a rim in the coupling head and encircles the opening. There shall be attached to each side of the guide or slot of the coupling head on the inside of said guide or slot and extending downward a spring 7 with a bent heel 32. Each of these springs shall be fastened to the coupling head by a machine screw 9 and a lock washer 8, said screw entering the coupling head at the top as shown. The purpose of these springs is to hold the wedge securely in place so that it will not be appreciably moved from its position until pulled therefrom by a dropping or falling brake beam.

Fig. 9 shows an elevation of the face of the wedge with the rubber gasket 3 fitting into and held in place by a rim in said wedge. This gasket space shall be pocketed in the rear so that the gasket may be easily removed when necessary by pressing one side of the gasket into the pocket. This pocket is clearly shown in Fig. 6, a cross section of the wedge, said pocket being designated by numeral 37, the rubber gasket by numeral 3, and the encircling rim by numeral 28, the tongue of the wedge by numeral 35. The wedge has a recess 31 (Fig. 9) in each edge into which the heels 32 of the springs will drop when the wedge reaches its normal position in the coupling head and closely fit; said wedge is beveled at 33 (Fig. 9) on each edge at the bottom. I have shown by dotted lines in Fig. 9 the method of fastening the wedge hook spring 4 to the wedge by the screws 6 and the lock washer 5 but will explain said wedge hook spring and wedge hook more fully later on. This wedge hook is made with the spring shown so that when it is desired to push the wedge down into its normal position in the coupling head the chain connecting the wedge with the brake beam may be disengaged from the hook. Otherwise it would be impossible to raise the wedge high enough to push same down into the coupling head. The springs 7 (Fig. 8) are shown strengthened at the point on top where the spring is bent downward since this is the point where the greatest strain is made on the spring. To place the wedge in its normal position in the coupling head said wedge must first be disconnected from the chain by which it is attached to the brake beam and then pushed down into the slots or guides in the coupling head. As the wedge is gradually forced down into said guides of the coupling head the beveled edges 33 of the wedge engage the heels 32 (Fig. 8) of the springs 7 and, as the wedge continues its downward course, temporarily force said heels 32 of the springs 7 into the recesses 30 in the guides of the coupling head. When the rubber gasket in the face of the wedge reaches and is exactly superimposed over the rubber gasket in the face of the coupling head the heels 32 of the springs 7 will drop into the recesses 31 in the wedge and the wedge will then have attained its normal position closing up the opening 36 (Fig. 8) in the face of the coupling head, all leakage of air being prevented by the close contact of the rubber gaskets. The chain 14 (Fig. 1) must then be slipped into the spring hook located at the lower tip of the wedge thus connecting the wedge with the brake beam. The connection of the chain 14 with the brake beam shall always be a permanent connection. Ordinary vibrations and movements of a brake beam will not be enough, since the chain in each instance is to have some slack, to pull the wedge from its normal position. When the wedge is in its normal position in the coupling head with the heels 32 of the springs 7 in the recesses 31 (see Fig. 4) of the wedge the edges of the wedge below the springs will slightly clear the inside surfaces of the guides or slots of the coupling head and the edges of the wedge above the recesses 31 (Fig. 4) will closely engage the sides of the springs 7 at 39. The top surface of the recess 31 (Fig. 9) in the wedge shall be at such an angle that a down pull on the wedge when in its normal position by a dropping brake beam will force the heels 32 of the springs 7 into the recesses 30 (Fig. 8) in the coupling head and allow the wedge to be pulled down and out of the coupling head.

Fig. 5 shows a cross section of the coupling head with the wedge removed, numeral 28 designating the rim which encircles and holds the rubber gasket 3, numeral 34 designating the slots or guides of the coupling head which receive the tongues 35 (Fig. 6) of the wedge.

In Fig. 7, a longitudinal section of the coupling head and the wedge, the wedge hook 40 is clearly shown. This hook shall be a part of the wedge projecting from the bottom thereof as shown and shall be made strong enough so that when the pull of a dropping brake beam is exerted on the hook said hook will not be broken. Numeral 4 designates the hook spring which is attached to the back of the wedge by the screws 6 held in place by the lock washer 5 and the lower end of said spring is normally in close contact with the inner side of the tip of the hook.

Fig. 4 shows the wedge in its normal position in the coupling head.

Having thus described my invention I claim as new and desire to secure by Letters Patent:

1. In combination with the train pipe of a vehicle screw-cap closed side pipes connected with the train pipe, four way connection between said train pipe and side pipes, said side pipes being one on each side of the train pipe and attached to the bottom or the sills of the car or vehicle, flexible pipe or hose connections between said side pipes and the coupling-head, said side pipes being provided with cut-off cocks, a coupling-head equipped with a resiliently held wedge and having an air-passage extending therethrough and in communication with said hose, said wedge being movable in guides in the face of said coupling-head, and means of connection between said wedge and the brake beam.

2. In a device of the type described, a coupling-head having a communicating air-passage, and a wedge-member arranged for attachment to a brake-beam, said coupling-head and said wedge-member being equipped with contacting gaskets and arranged to be interfitted with each other, resilient retaining means therebetween, and means for connecting the coupling-head air-passage with an air-pressure supply.

3. In a device of the type described, a coupling-head having an upstanding air-intake tubular extension, and a wedge-member equipped with a brake-beam attaching means, said coupling-head and said wedge-member having interfitting guide flanges and guide sockets, respectively, and contacting gaskets, and resilient retaining means between said coupling-head and said wedge-member.

4. In a device of the type described, a coupling-head having a tubular extension for communication with an air-pressure supply means, a wedge-member having an attaching member, and a flexible connection between said attaching member and said brake-beam, and resilient retaining means for said wedge-member interposed between said coupling-head and said wedge-member.

5. In a device of the type described, a coupling-head having a tubular extension, an air-pressure conducting pipe attached to said tubular extension, a wedge-member having a hook attachment, a flexible connection between said hook attachment and said brake-beam, said coupling-head and said wedge-member having interfitting flanges and guide-slots, respectively, said coupling-head and wedge-member being equipped with contacting gaskets, and resilient fastenings interposed between said coupling-head and wedge-member.

In testimony whereof I hereunto affix my signature in presence of two witnesses.

HAROLD CHESTER STANLEY.

Witnesses:
 WALTER L. VAUGHAN,
 C. L. WILSON.